3,562,235
MULTISTAGE EMULSION POLYMERIZATION OF ALKYL ACRYLATES AND ALKYL METHACRYLATES
Charles F. Ryan, Warminster, Pa., assignor to Rohm and Haas Company, Philadelphia, Pa., a corporation of Delaware
No Drawing. Continuation-in-part of application Ser. No. 526,038, Feb. 9, 1966. This application June 7, 1968, Ser. No. 735,191
Int. Cl. C08f *15/18*
U.S. Cl. 260—885        13 Claims

ABSTRACT OF THE DISCLOSURE

Thermoplastic acrylic polymer compositions prepared in multi-stage emulsion fashion are provided. For example, the polymer particles have rubbery, cross-linked cores of alkyl acrylates at least partially sheathed by increasingly harder thermoplastic copolymer sheaths of alkyl acrylates and alkyl methacrylates with some penetration between the layers. The compositions may be extruded, blown and/or formed into film or sheet.

---

This application is a continuation-in-part of pending application Ser. No. 526,038, filed Feb. 9, 1966 now abandoned.

This invention relates to multistage heterogeneous copolymers prepared by sequential emulsion polymerization of alkyl esters of acrylic and methacrylic acid. More particularly, this invention relates to sequentially prepared emulsion copolymers containing the polymerization product and/or products of at least four stages or phases. These copolymers are solid, thermoplastic materials and may be used as impact modifiers and processing aids in vinyl chloride resins, acrylic resins, styrene resins, and other resinous materials; additionally, the copolymeric products of the present invention are eminently suited for the production of films and sheets, particularly continuous film which can be applied to various substrates, for example, by roll laminating such film (or by utilizing other conventional techniques) to exterior siding substrates and other building products, thereby producing a decorative and protective layer thereon.

The copolymers of this invention, hereinafter usually referred to more simply by the generic term "polymers," are produced by carefully controlled emulsion polymerization technique. In the first step or first stage, a rubbery, uniformly crosslinked copolymer is formed by emulsion copolymerizing an alkyl ester of acrylic acid with a small amount of a crosslinking monomer. This takes place with the aid of about 0.1 to 3.0 percent by weight of a suitable emulsifier, based on the weight of the first-stage monomers, and an initiating system, preferably redox in nature. The first-stage monomers may be added gradually or in one charge. The copolymerization is conducted under such reaction conditions as to form a medium to large particle size first-stage latex, usually in the range of about 400 to 2000 angstrom units in radius. Then, as a second step or second stage, and in the presence of the preformed latex, there is polymerized a mixture of a lower alkyl ester of methacrylic acid, such as methyl methacrylate, and an alkyl ester of acrylic acid under conditions such that the chains become attached to and/or intimately associated with the poly(alkyl acrylate) crosslinked chains (from the first stage). During the second stage, additional initiator may be added, but no additional emulsifier is ordinarily used, so that essentially no new, additional and distinct particles are produced. Preferably, the monomers used in the second stage are added gradually. After completion of the second-stage polymerization, a mixture of a lower alkyl methacrylate and an alkyl acrylate is added and polymerized in the presence of the two-stage latex, thereby causing attachment and/or intimate association of the third stage or phase onto the preformed two-stage latex. Preferably, the monomers in the third stage are added gradually. Again, no additional emulsifier is ordinarily used, so that essentially no new, additional and distinct particles are formed. More initiator may be used, however, if desired. In the fourth stage, and where the fourth stage is the last stage, there is added a mixture of an adhesion promoter, such as methacrylic acid, and a lower alkyl methacrylate optionally containing a small amount of an alkyl acrylate; this mixture is polymerized in the presence of the three-stage latex. Preferably, the monomers added in the last stage are added gradually and polymerized quickly, thereby causing an attachment with or without partial penetration and/or layering of the last stage or phase onto the preformed latex. The resultant solid, thermoplastic polymeric product may be isolated from the emulsion by evaporation, by suitable coagulation and washing, such as by salt coagulation, by freezing, etc., or it may be isolated as by spray drying.

With reference to the first stage reactants, the alkyl group in the alkyl ester of acrylic acid generally contains 2 to 8 carbon atoms. The alkyl group can be a straight or branched chain. Polymers formed in the first stage must have a glass transition temperature ($T_g$) of $-20°$ C. or below (e.g., $-30°$ C., $-40°$ C., etc.). Part of the alkyl acrylate, up to a maximum of about 20% by weight, can be replaced with a non-crosslinking (with respect to the alkyl acrylate) monoethylenically unsaturated monomer having a terminable group $H_2C=CH-$ interpolymerizable therewith. Examples of vinylidene monomers interpolymerizable or copolymerizable with the alkyl acrylate monomer are vinylidene chloride, vinyl chloride, acrylonitrile, vinyl esters, alkyl methacrylic esters, styrene, ring-alkylstyrenes such as o-, meta-, and p-methylstyrenes, $\alpha$-alkylstyrenes such as $\alpha$-methylstyrene, and the like. A crosslinking bi- or polyfunctional monomer must be used in the first stage for crosslinking the alkyl acrylate monomer. The presence and level of crosslinking monomer is critical to the successful result of the present invention; the range of 0.1 to 5% by weight based on the alkyl acrylate is satisfactory, with 0.5 to 1.5% by weight being preferred. Also, the crosslinking monomer should desirably have the ability to crosslink the alkyl acrylate uniformly. Crosslinking monomers which have this ability are those which are incorporated evenly in the polymerization reaction and independently of the extent of the completion of the reaction. In other words, their rate of consumption is essentially the same as the principal monomer such as the alkyl acrylate which is present. It is therefore preferred to use as the crosslinking monomer an alkylene glycol diacrylate such as ethylene glycol diacrylate, 1,3-butylene glycol diacrylate, 1,4-butylene glycol diacrylate, and propylene glycol diacrylate. Other crosslinking monomers such as the corresponding dimethacrylates to the diacrylates above, divinyl benzene, divinyl adipate or diallyl phthalate also may be used.

For example in the four-stage version the crosslinked, rubbery, first stage comprises about 10 to 75% by weight of the total weight of the multi-stage heterogeneous polymer, the balance of the weight, i.e., 90 to 25% being distributed amongst the subsequent stages. In all subsequent stages there is a gradually diminishing amount of the alkyl acrylate. (A corollary of this is that there is present in each succeeding stage a gradually increasing amount of lower alkyl methacrylate, i.e., $C_1$ to $C_4$ alkyl methacrylate.) Thus, the second stage can contain about 10 to 90% by weight of the alkyl acrylate, the balance of 90 to 10% being the lower alkyl methacrylate; the third stage can contain about 5 to 40% by weight of the alkyl acrylate, the balance 95 to 60% being the lower alkyl methacrylate. In the last or hard stage there is present 0 to 20% by weight alkyl acrylate and 80 to 100% by weight lower alkyl methacrylate. Typically, each succeeding stage will contain about 1/10 to 3/4 the amount of alkyl acrylate, for example, butyl acrylate, that is present in the immediate preceding stage.

A significant limitation on the character of the last or hard stage is its glass transition temperature ($T_g$). The $T_g$ of the last stage should be at least 60° C. or higher. Lower alkyl methacrylate which can be used in the last stage (as well as the prior stages except the first) comprise $C_1$ to $C_4$ alkyl methacrylates. Suitable examples, in addition to methyl methacrylate, are ethyl methacrylate, isopropyl methacrylate, t-butyl methacrylate and the like or mixtures of these monomers. Preferably, the last stage contains a minor amount, i.e., about 1 to 20 parts per 100 parts of last stage ester monomers, of an adhesion promoter which incorporates acid units therein. Examples are $\alpha,\beta$-unsaturated acids such as acrylic acid, methacrylic acid, etc., and unsaturated dicarboxylic acids such as maleic, fumaric, and itaconic acids.

In each stage after the first, part of the alkyl acrylate and/or lower alkyl methacrylate, up to a maximum of about 20% by weight, can be replaced with a monoethylenically unsaturated monomer having a terminal group $H_2C{=}CH{-}$ interpolymerizable therewith. Such monomers include, for example, vinylidene chloride, vinyl chloride, acrylonitrile, vinyl esters, styrene, ring-alkyl-styrenes such as o-, m-, and p-methylstyrenes, $\alpha$-alkyl-styrenes such as $\alpha$-methylstyrene, and the like.

As noted hereinabove, the rubbery, crosslinked first stage can comprise about 10 to 75% by weight, overall, of the multi-stage heterogeneous polymer. The balance, i.e., 90 to 25% by weight, may be distributed evenly or unevenly amongst the remaining stages, with the proviso that no one single stage be present in an amount less than one-fifth nor more than three-quarters of the total amount by weight of the remaining stages (i.e., all but the first). This proviso refers to and is limited to the use of the term "stages" as described throughout the specification. Additional steps may be added without departing from the invention and in fact carefully controlled continuous addition of monomers of varying composition is not precluded. Thus, the process limitations throughout the specification are directed to the "stages" as defined and described and should not be taken to limit the scope of the invention as to the number of steps taken to obtain the composition of the invention.

Any of a variety of common emulsifiers well known in the art for emulsion polymerization of acrylates and methacrylates can be used. A low level of emulsifier is desirable, preferably below one percent by weight on the total weight of polymerizable monomers charged in all stages. Useful emulsifying agents include common soaps, alkylbenzenesulfonates, such as sodium dodecyl benzene sulfonate, ($C_8$-$C_{18}$)-alkylphenoxypolyethylene sulfonates, sodiumlauryl sulfate, salts of long-chain amines, salts of long-chain carboxylic and sulfonic acids, etc. In general, the emulsifier should be compounds containing hydrocarbon groups of 8 to 22 carbon atoms coupled to highly polar solubilizing groups such as alkali metal and ammonium carboxylate groups, sulfate half ester groups, sulfonate groups, phosphate partial ester groups and the like.

The polymerization medium in each stage or step will preferably contain an effective amount of a suitable oil-soluble, water-insoluble, free radical generating polymerization initiator, which is activated either thermally or by an oxidation-reduction (or redox) reaction. The preferred initiators are those which are the result of redox reactions, since they allow for efficient polymerization at moderate reaction temperatures. Examples of suitable initiators are combinations such as cumene hydroperoxide-sodium metabisulfite, diisopropylbenzene hydroperoxide-sodium formaldehyde sulfoxylate, tertiary butyl peracetate-sodium hydrosulfite, cumene hydroperoxide-sodium formaldehyde sulfoxylate, etc. Water-soluble initiators may also be used, although less desirable; examples of such initiators or initiator combinations are sodium persulfate, potassium persulfate-sodium formaldehyde sulfoxylate, etc.

In general terms, the physical make-up of the polymeric product produced by the multi-stage emulsion polymerization technique of the present invention, for example, by the four-stage process described above, may be visualized as that consisting of a rubbery, uniformly crosslinked, first-stage polymer or phase and attached thereto or intimately associated therewith a series of subsequently formed phases or polymers. From microscopic examination and from minimum film forming temperature data, it is apparent that there is a gradual gradation, from the first-stage polymer to the last-stage polymer, in location of the polymer phases from the inside toward the outside or surface of the polymeric particles. Each succeeding phase associates with the existing latex particles formed by the preceeding stage or stages, apparently by a combination of at least some penetration and encapsulation or layering. Thus, in the case of a four-stage (or four-phase) polymeric product, the second stage is apparently attached to or intimately associated with the first stage with only slight layering, the third stage is apparently attached to or intimately associated with the two-stage material with more layering and the fourth stage, i.e., the last or hard stage, is apparently attached to or intimately associated with the three-stage material by substantially all layering and with relatively little penetration of the prior three-stage material. The physical make-up of the particles may be described not only in terms of phases but also in terms of a core based primarily on a crosslinked, rubbery polyacrylate and sheaths of various compositions of increasing hardness from the inside out. However, it is believed that there may be at least some penetration by the composition of each sheath into the previously formed particle which is either partially or in some cases completely encased by the sheath. It is believed that each succeeding sheath has lesser penetration of the previously formed portion of the particle. The amount of penetration depends on the exact composition of the core and each sheath. This gradation effect is believed to be responsible for the unique combination of properties displayed by the polymeric product, particularly when employed as a film material, and for overcoming the known and otherwise objectionable incompatibility characteristics of acrylates and methacrylates. Thus, when the polymeric product is utilized in film form, there are present outstanding elongation characteristics coupling with excellent blocking resistance. Typically, extruded and blown film made from the polymers of the present invention has at least 35% elongation (and as high as 90%), permitting thereby film laminates to be bent and worked over sharp corners and bends without cracking, peeling, or delamination. These films also exhibit excellent blocking resistance, i.e., resistance to sticking together; for example, film to film and film to metal tests show resistance to sticking or blocking at temperatures up to 150° F. and higher.

The multistage heterogeneous emulsion polymers of the present invention, including four-stage, five-stage, and up to six or more stages, may have melt index values in the range 0.01 to 20 with the range 0.75 to 3.5 being preferred. Such polymers also desirably have minimum film forming temperatures (MFT) of approximately 75° C. to 100° C.

In the specification and in the following examples and tables, all parts and percentages are on a weight basis unless otherwise mentioned.

EXAMPLE 1

Preparation of 4-stage heterogeneous polymer and film therefrom

To a reactor equipped with stirrer, thermometer, nitrogen sweep, inlets for monomer addition, and reflux condenser, are charged 1000 parts deionized water, 41.6 parts of a 10% solution of sodium octylphenoxypolyethoxy sulfonate emulsifier (containing two ethylene oxide units), 0.14 part of acetic acid, 139 parts of butyl acrylate, 1.39 parts of 1,3-butylene glycol diacrylate, and 0.12 part of diisopropylbenezene hydroperoxide. The mixture is vigorously degassed with nitrogen for 90 minutes at 30° C. and, while degassing over the surface is continued, a solution of 0.015 part sodium sulfoxylate formaldehyde in 20 parts water is added gradually and polymerization of the first-stage monomers carried out to substantial completion over a period of about 30 minutes. The reaction mixture is then heated to 85° C. at which point a solution of 0.14 part sodium sulfoxylate formaldehyde in a small amount of water is added, followed by gradual addition at 85° C. for one hour of a mixture of 0.28 part diisopropylbenzene hydroperoxide, 55.4 parts butyl acrylate, and 83.2 parts of methyl methacrylate. After the monomer addition is complete, the mixture is stirred for 30 minutes at 85° C. and polymerization of the second-stage monomers is carried out to substantial completion.

A third stage is then added under conditions similar to the second stage. After addition of a solution of 0.14 part sodium sulfoxylate formaldehyde in 20 parts water, a mixture of 14.1 parts butyl acrylate, 125 parts methyl methacrylate, 0.277 part diisopropylbenzene hydroperoxide, and 0.35 part n-dodecyl mercaptan is added over a period of one hour. After monomer addition is complete, the temperature is maintained at 85 to 90° C. over a 30-minute period and polymerization of the third-stage monomers substantially completed. There is then added a solution of sodium sulfoxylate formaldehyde (0.277 part in 1 part water) followed by the addition at 85 to 90° C. over a one-hour period of a mixture of 2.77 parts butyl acrylate, 136 parts methyl methacrylate, 5.5 parts methacrylic acid, 1.1 part diisopropylbenzene hydroperoxide and 1.39 parts t-dodecyl mercaptan. After addition is complete, the reaction temperature is maintained at 85 to 90° C. for one hour and polymerization of the fourth-stage monomers substantially completed. The emulsion is then cooled and the polymer product is isolated from emulsion by addition thereof to an equal weight of water containing 5% sodium chloride, then filtered and dried thoroughly in a vacuum oven. The polymer product has a melt index of 0.8.

The polymer is extruded and blown into three-mil film. The free film has the following properties: tensile strength 5170 p.s.i. machine direction (M), 5570 p.s.i. transverse direction (T); elongation: 51% M, 43% T; modulus of elasticity: 269,000 M, 299,000 T.

The film is laminated to aluminum and properties of the laminate measured. Dry adhesion is very good, fabrication behavior excellent, as judged by the ability of the laminate to resist cracking on tight bending, and reverse impact strength is very good at temperatures as low as 0° F. There is no blocking of face-to-face or face-to-back film laminates at 140° F., and only minor blocking or face-to-face laminates at 180° F., while print resistance at these temperatures is also excellent.

The film can be laminated directly to aluminum, i.e., without the use of an external adhesive, in which case it exhibits good dry adhesion. Excellent wet and dry adhesion can be observed when an external adhesive, such as Armstrong J–1199, is applied to the substrate. The film can be pigmented and filled. Loading or compounding with 15% $TiO_2$ or other pigment gives a film with somewhat lower resistance to impact at 0° F., but the properties of the film laminated to steel or aluminum are still outstanding.

EXAMPLE 2

Preparation of 5-stage copolymer

To a reactor equipped with stirrer, thermometer, nitrogen sweep, inlets for monomer addition, and reflux condenser, are charged 1000 parts deionized water, 33.3 parts of a 10% solution of sodium octylphenoxypolyethoxy sulfonate emulsifier (containing two ethylene oxide units), 0.11 part acetic acid, 111.2 parts of butyl acrylate, 1.11 parts of 1,3-butylene glycol diacrylate, and 0.096 part of diisopropylbenzene hydroperoxide. The mixture is degassed with nitrogen, and, while degassing over the surface is continued, a solution of 0.012 part sodium sulfoxylate formaldehyde in 20 parts water is added gradually and polymerization of the first stage monomers carried out to substantial completion over a period of about 30 minutes. The reaction mixture is heated to 85° C., at which point a solution of 0.11 part sodium sulfoxylate formaldehyde in 20 parts of water is added, followed by gradual addition at 85° C. for one hour of a mixture of 0.275 parts diisopropylbenzene hydroperoxide, 66.7 parts butyl acrylate, and 44.5 parts of methyl methacrylate. After the monomer addition is complete, the mixture is stirred for 30 minutes at 85° C. and polymerization of the second stage monomers is carried out to substantial completion. A third stage, consisting of a solution of 0.11 part sodium sulfoxylate formaldehyde in 20 parts of water, a mixture of 44.5 parts butyl acrylate, 66.7 parts of methyl methacrylate and 0.275 part diisopropylbenzene hydroperoxide is added over a period of about one hour. After monomer addition is complete, the temperature is maintained at 85–90° C. over a 30-minute period and polymerization of the third-stage monomers substantially completed. A fourth stage is then added under conditions similar to the third stage. After addition of 0.11 part sodium sulfoxylate formaldehyde in 20 parts water, a mixture of 11.1 parts of butyl acrylate, 100.1 parts of methyl methacrylate, 0.275 part diisopropylbenzene hydroperoxide, and 0.28 part n-dodecyl mercaptan is added at 85–90° C. over a period of about one hour, and polymerization substantially completed over a 30-minute period. Additional sodium sulfoxylate formaldehyde is then added (0.222 part in 20 parts water) and a fifth stage, comprising 2.25 parts butyl acrylate, 109 parts methyl methacrylate, 5.5 parts of methacrylic acid, 1.1 parts t-dodecyl mercaptan and 0.88 part diisopropylbenzene hydroperoxide is added gradually at 85 to 90° C. over a one-hour period. After addition is complete, the reaction mixture is maintained at 85 to 90° C. for an additional hour and polymerization of the fifth-stage monomers completed. The emulsion is cooled and the polymer product is isolated by coagulation with salt water; the product is then filtered and dried. A free film formed from the polymer product exhibits properties similar to those resulting from the four-stage polymeric product of Example 1.

Following the procedure of Example 1, a series of four-stage polymeric products are prepared; the proportions of the monomers making up these products are set forth in Table I below:

TABLE I

| Product identification | 1st stage monomers, BA:BDA | 2d stage monomers, BA:MMA | 3d stage monomers, BA:MMA | 4th stage monomers, BA:MMA:MAA |
|---|---|---|---|---|
| A | 30:0.3 | 9.3:14 | 2.3:21 | 0.5:22.8:1 |
| B | 35:0.35 | 8.7:13 | 2.2:19.5 | 0.4:21.3:1 |
| C | 40:0.4 | 8:12 | 2:18 | 0.4:19.6:1 |

NOTE.—BA=butyl acrylate; BDA=1,3-butylene glycol diacrylate; MMA=methyl methacrylate; MAA=methacrylic acid.

Properties of the polymeric products, identified as A, B, and C above, are given below in Table II.

TABLE II

| Product identification | MFT,[1] ° C. | Melt index[2] | Properties of extruded and blown film (3 mil)[4] | | |
|---|---|---|---|---|---|
| | | | Tensile strength (p.s.i.) M/T[3] | Percent elongation M/T | Modulus (10⁻⁵) M/T |
| A | 80 | 0.8 | 4,250/4,740 | 57.2/52 | 2.08/2.35 |
| B | 80 | 0.7 | 3,760/4,470 | 69.1/62.3 | 1.73/2.06 |
| C | 84 | 0.44 | 3,010/3,970 | 65.1/45.5 | 1.22/1.58 |

[1] Minimum film forming temperature of polymeric product.
[2] Melt index of polymeric product, value reported is number of grams of polymer that will flow through a 0.08 inch orifice at 200° C. and 200 p.s.i. during a 10-minute period.
[3] M=extrusion machine direction; T=transverse direction.
[4] Free films prepared from polymers A, B, and C, above, all show excellent block resistance, there is no appreciable blocking at temperatures up to 150° F. when the film is subjected to a pressure of 6 p.s.i. for 16 hours.

Following the procedure of Example 1, a series of four-stage polymeric products is prepared; the proportions of the monomers making up these products are set forth in Table III below:

TABLE III

| Product Identification | 1st stage monomers, BA:Sty:BDA | 2d stage monomers, BA:Sty:MMA | 3d stage monomers, BA:Sty:MMA | 4th stage monomers, BA:MMA:MAA |
|---|---|---|---|---|
| D | 21.25:3.75:0.25 | 10:1.9:13.1 | 2.5:0.25:22.25 | 0.5:24.5:1 |
| E | 21.25:3.75:0.25 | 10:2.5:12.5 | 2.5:0.5:22 | 0.5:24.5:1 |

NOTE.—BA=butyl acrylate; BDA=1,3-butylene glycol diacrylate; Sty=styrene; MMA=methyl methacrylate; MAA=methacrylic acid.

Properties of the polymeric product, identified as D and E above, are given below in Table IV.

TABLE IV

| Product identification | MFT,[1] ° C. | Melt index[2] | Properties of extruded and blown film (3 mil)[4] | | |
|---|---|---|---|---|---|
| | | | Tensile strength (p.s.i.) M/T[3] | Percent elongation M/T | Modulus (10⁻⁵) M/T |
| D | 85 | 1.1 | 4,685/4,946 | 48.8/10.6 | 2.16/2.80 |
| E | 84 | 2.3 | 4,630/4,830 | 52.6/30.9 | 2.19/2.53 |

See footnotes 1, 2, 3, Table II.
[4] Free films prepared from polymers D and E, above, all show excellent block resistance, there is no appreciable blocking at temperatures up to 150° F. when the film is subjected to a pressure of 6 p.s.i. for 16 hours.

A series of film laminates is prepared with films formed from the polymeric products of this invention. The substrate is chromate pretreated (alodine 1200 S) 24 gauge aluminum. The film in each case is of 3 mil thickness and is roll laminated to the substrate, coated with an external adhesive, at a temperature of approximately 400° F. The films identified below (Table V) as "Example 1—A, B, and C" contain 13 parts of the TiO₂ pigment to 87 parts of polymer; the films D and E are clear and unpigmented. The films, compositionwise, are the same as the corresponding products shown in Tables I and III, above.

TABLE V.—PROPERTIES OF FILM LAMINATES

| Film Identification | Substrate | T-bend* fabrication T₀/T₁ | Reverse impact (inch-lbs.) room temp. 5° F. |
|---|---|---|---|
| From Example 1 | Aluminum | <1/0 | 45/25 |
| From: | | | |
| A, Table I | do | 0/0 | 45/35 |
| B, Table I | do | 0/0 | 50/35 |
| C, Table I | do | 0/0 | 66/35 |
| D, Table III | do | <1/0 | |
| E, Table III | do | 0/0 | |

*The T-bend fabrication test is a rigid test designed to measure the ability of the laminate to withstand fabrication. An initial bend is started over a one-eighth inch rod and them completed between the jaws of a vise to form a 180° bend. The edge of the bend is examined under a 25 power microscope and is rated from 0 to 10 which corresponds to 0 to 100% cracking, breaking, etc., of the film. The sample is again folded 180° to form a flattened roll, so that each successive bend is of a larger radius. The bending is continued until an edge rating of zero is obtained. The initial bend is T₀; the second is T₁, etc.

While the above table shows the results for film-aluminum laminates, equally good results can be obtained when the films are laminated to other metallic substrates, for example, steel and galvanized steel. Additionally, films of the compositions of the present invention may be applied to non-metallic substrates, such as hardboard, asbestos cement, plywood, lumber and roofing materials. It is sometimes desirable to precoat the substrate with an external adhesive, particularly in the case of metallic substrates, although, as noted heretofore, the films may be laminated directly to aluminum with or without external adhesive. The films of the present invention are not limited in their use to or with any particular adhesive as any good commercially available general purpose metal to plastic, or non-metal to plastic adhesive, may be used. Examples of suitable adhesives are organic solvent solutions of terpolymers of methyl methacrylate, ethyl acrylate and methacrylic acid which contain about 55–65 parts of methyl methacrylate, 35–39 parts of ethyl acrylate and 1–5 parts of methacrylic acid or the commercially available adhesive, Armstrong Cork Company's J-1199, containing a vinyl chloride-vinyl acetate copolymer, an acrylic polymer and an epoxy resin in an organic solvent such as toluene and methyl ethyl ketone.

Films and sheets formed from the compositions of the present invention may vary in thickness from about 1 mil to 50 mils, with the range 1 to 10 mils being preferred. Ordinarily, such films are prepared by extrusion and blowing technique well known in the art; for example, at temperatures ranging from about 375° F. to 500° F. The films may also be formed by compression molding. In the case of clear films, no additional ingredient need be added. Where color or opacity is desired, the films may be compounded to include common fillers, pigments, dyes, stabilizers, etc. Common fillers which may be employed include, for example, ground and precipitated calcium carbonate, barytes, diatomaceous earth, various clays, etc. Common pigments which may be used include, for example, titanium dioxide, cadmium reds, chrome oranges and yellows, phthalocyanine greens and blues, etc.

As used in the specification and claims attached hereto, the term "polyfunctional crosslinking monomer" includes difunctional or bifunctional crosslinking monomers—that is, monomers containing two reactive or functional groups as well as crosslinking monomers containing more than two reactive or functional groups.

The term "sequentially emulsion polymerized" or "sequentially emulsion produced" refers to polymers (which term includes copolymers as well as homopolymers) which are prepared in aqueous dispersion or emulsion and in which successive monomer charges are polymerized onto or in the presence of a preformed latex prepared from a prior monomer charge and stage. In this type of polymerization, each succeeding stage or phase is attached to and intimately associated with its preceding stage or phase or preceding stages or phases. Although the exact nature of this attachment is not known, and while it may be chemical or physical or both, the sequentially prepared polymers or copolymers of the present invention are characterized by and are made by a process in which the total particle content is substantially constant upon completion of the first stage polymerization, i.e., new additional and distinct particles are avoided after the first stage, as heretofore noted.

The multistage sequential emulsion polymerization can be carried out at temperatures ranging from about 0° C. to 125° C. with 30° C. to 95° C. being preferred. The polymerization medium may contain, in accordance with known practice, a chain transfer agent such as tertiary dodecyl mercaptan, secondary butyl mercaptan, normal dodecyl mercaptan, and the like, particularly for limiting, where desired, the molecular weight of phases or stages containing the lower alkyl methacrylate. The free radical initiator will be used in an effective amount, which will vary, depending on the monomers, the temperature and the method of addition; but, generally, the quantity of initiator will vary from about 0.001 to 2% by weight in each polymerization stage based on the weight of the monomer charge, with up to a maximum of about 5% by weight based on the total weight of the monomers charged in all the stages.

The multistage heterogeneous polymers of the invention may be used, as noted hereinbefore, to improve the processing and the impact properties of vinyl chloride resins, styrene resins, acrylic resins and other resinous materials by being blended therewith. Typically, such blends will contain 75 to 95% by weight of the resin or resinous material and 25 to 5% by weight of multistage heterogeneous polymer.

The above descriptions of the invention are set forth only by way of illustration. As will be apparent to those skilled in the art, other variations and modifications can readily be employed without departing from the spirit and scope of the invention described above and claimed below.

What is claimed is:

1. A process for making a thermoplastic polymeric composition of matter capable of being extruded, blown or molded comprising the steps of:

polymerizing essentially to completeness a first-stage monomer system emulsified in water, said first-stage monomer system consisting essentially of at least one monomer chosen from the group consisting of alkyl acrylates having two to eight carbon atoms in the alkyl group and at least one polyethylenically unsaturated monomer, said monomer system being chosen so that the maximum glass transition temperature is not over −20° C.;

adding to the resultant aqueous system a second-stage monomer system, said second-stage monomer system consisting essentially of a mixture of 10% to 90% by weight of at least one monomer chosen from the group consisting of alkyl acrylate having two to eight carbon atoms in the alkyl group and 90% to 10% by weight of at least one monomer chosen from the group consisting of alkyl methacrylates having one to four carbon atoms in the alkyl group;

polymerizing the second-stage monomer system in the aqueous system in the presence of a free-radical type catalyst until the polymerization of said second-stage monomer system is essentially complete under conditions which cause association of polymer molecules formed of the second-stage monomer system with the particles of the first stage;

then adding to the aqueous polymer dispersion one or more subsequent-stage monomer systems, said monomer systems consisting of mixtures of at least one monomer chosen from the group consisting of alkyl acrylates having two to eight carbon atoms in the alkyl group and at least one monomer chosen from the group consisting of alkyl methacrylates having one to four carbon atoms in the alkyl group, each such subsequent-stage monomer system containing from about 1/10 to 3/4 the amount of alkyl acrylate present in the immediately preceding stage;

polymerizing each of the subsequent monomer systems in the aqueous system in the presence of a free-radical type catalyst under conditions which cause association of the polymer molecules formed in a respective one of the monomer systems with the polymer particles as produced by the association of the earlier stages;

adding to the resultant polymer dispersion a last-stage monomer system, said monomer system consisting essentially of 80 to 100% of at least one monomer chosen from the group consisting of alkyl methacrylates having one to four carbon atoms in the alkyl group and 0.0 to 20% of at least one monomer chosen from the group consisting of alkyl acrylates having two to eight carbon atoms in the alkyl group, and polymerizing said monomer system in the aqueous system in the presence of a free-radical type catalyst until the polymerization thereof is essentially complete under conditions which cause association of the polymer molecules formed of the last-stage monomer system with the particles as produced by the association of the earlier stages;

the weight of the first-stage monomer system comprising 10 to 75% of the total polymeric composition weight and the subsequent stages comprising 90 to 25% by weight of the total polymeric composition weight;

the weight of each successive stage after the first stage comprising 20 to 75% of the total weight of all the successive stages after the first stage.

2. The process of claim 1 wherein there are four stages.

3. The process of claim 2 wherein the first stage monomer system is composed of 95 to 99.9% by weight of at least one alkyl acrylate having 2 to 8 carbon atoms in the alkyl group and 0.1 to 5% of a polyethylenically unsaturated monomer;

the second stage is composed of 10 to 90% by weight of at least one alkyl acrylate having two to eight carbon atoms in the alkyl group and 90 to 10% by weight of at least one alkyl methacrylate having 1 to 4 carbon atoms in the alkyl group;

the third stage is composed of 5 to 40% by weight of at least one alkyl acrylate having two to eight carbons in the alkyl group and 95 to 60% by weight of at least one alkyl methacrylate having 1 to 4 carbons in the alkyl group, and the last stage is composed of 0.0 to 20% by weight of at least one alkyl acrylate having two to eight carbon atoms in the alkyl group, and 100 to 80% of at least one alkyl methacrylate having one to four carbon atoms in the alkyl group.

4. The process of claim 3 wherein there is included in the last stage a minor amount of a polymerizable unsaturated acid selected from the group consisting of $\alpha,\beta$-unsaturated monocarboxylic and dicarboxylic acids.

5. The process of claim 3 wherein the alkyl acrylate in each stage is butyl acrylate, the crosslinking monomer in the first stage is 1,3-butylene glycol diacrylate, the alkyl methacrylate in the last three stages is methyl methacrylate, and the acid in the last stage is methacrylic acid.

6. The process of claim 3, wherein part of the monomer charge of alkyl acrylate is replaced in at least one of the stages with another monoethylenically unsaturated monomer interpolymerizable therewith up to about 20% by weight.

7. The thermoplastic polymeric product obtained by the process of claim 1.

8. The thermoplastic polymeric product obtained by the process of claim 3.

9. The thermoplastic polymeric product obtained by the process of claim 1, in which the melt index thereof is in the range of 0.01 to 20 and the minimum film forming temperature is in the range of 75 to 100° C.

10. The thermoplastic polymeric product of claim 1 wherein the glass transition temperature of the last stage is at least 60° C.

11. The thermoplastic polymeric product obtained by the process of claim 1 in the form of a film having a thickness of 1-50 mils.

12. As an article of manufacture, a film formed of the composition of matter of claim 11 containing therein a pigment or a filler.

13. As an article of manufacture, a composite article comprising a film of the composition of matter defined in claim 11 laminated to a metallic or non-metallic substrate.

References Cited

UNITED STATES PATENTS

| | | | |
|---|---|---|---|
| 3,041,309 | 6/1962 | Baer | 260—45.5 |
| 3,448,173 | 6/1969 | Ryan et al. | 260—876 |
| 3,458,603 | 7/1969 | Griffin | 260—881 |

SAMUEL H. BLECH, Primary Examiner

R. J. SEIBERT, Assistant Examiner

U.S. Cl. X.R.

117—75, 126, 132, 148, 161; 260—29.6, 29.7, 30.8, 31.2, 32.6, 41, 876, 881, 884